United States Patent [19]

Simonsen

[11] Patent Number: 5,200,223
[45] Date of Patent: Apr. 6, 1993

[54] METHOD AND AN APPARATUS FOR INJECTING A LIQUID INTO MEAT

[75] Inventor: Knud Simonsen, Slagelse, Denmark

[73] Assignee: Simo Industries A/S, Slagelse, Denmark

[21] Appl. No.: 719,116

[22] Filed: Jun. 20, 1991

[30] Foreign Application Priority Data

Jun. 20, 1990 [DK] Denmark .............................. 1507/90

[51] Int. Cl.⁵ ............................................ A23L 1/31
[52] U.S. Cl. .................... 426/281; 426/323; 426/574; 426/641; 99/533; 99/535
[58] Field of Search ............. 426/281, 323, 641, 573, 426/574, 802; 99/535, 532, 533

[56] References Cited

U.S. PATENT DOCUMENTS

| | | | |
|---|---|---|---|
| 2,629,311 | 2/1953 | Graves | 426/281 |
| 3,016,004 | 1/1962 | Harper, Jr. et al. | 99/532 |
| 3,436,230 | 4/1969 | Harper, Jr. | 426/281 |
| 3,607,314 | 9/1971 | Lugiewicz | 426/513 |
| 3,615,704 | 10/1971 | Pederson | 426/281 |
| 3,649,299 | 3/1972 | Sholl | 426/281 |
| 3,675,567 | 7/1972 | Rejsa et al. | 99/257 |
| 3,769,037 | 10/1973 | Sholl | 426/281 |
| 3,814,007 | 6/1974 | Lumby et al. | 99/532 |
| 3,928,634 | 12/1975 | Gasbarro | 426/281 |
| 4,258,068 | 3/1981 | Huffman | 426/513 |
| 4,388,859 | 6/1983 | Sommer | 99/535 |
| 4,615,076 | 10/1986 | Shimokawa | 426/513 |
| 4,903,590 | 2/1990 | Muller et al. | 426/281 |
| 5,057,332 | 10/1991 | Davidson et al. | 426/281 |

FOREIGN PATENT DOCUMENTS

| | | | |
|---|---|---|---|
| 1158094 | 12/1983 | Canada | 426/281 |
| 59-2650 | 1/1984 | Japan | 426/281 |
| 62-40265 | 2/1987 | Japan | 426/513 |
| 556772 | 7/1977 | U.S.S.R. | 99/535 |
| 556773 | 7/1977 | U.S.S.R. | 99/535 |

*Primary Examiner*—Joseph Golian
*Assistant Examiner*—Leslie Wong
*Attorney, Agent, or Firm*—Larson and Taylor

[57] ABSTRACT

Instead of using injection needles, that have to be inserted into and withdrawn from the meat with the latter substantially stationary relative to the needles, the method and apparatus of the invention use high-pressure nozzles (11) directing powerful jets of liquid penetrating into the meat to the requisite depth, preferably while the meat is being conveyed through a set of conduits, including a unit (7) containing said nozzles (11), preferably also a vibration-massage unit (8) and a deformation-massage unit (9), before being delivered through an outlet unit (10).

14 Claims, 1 Drawing Sheet

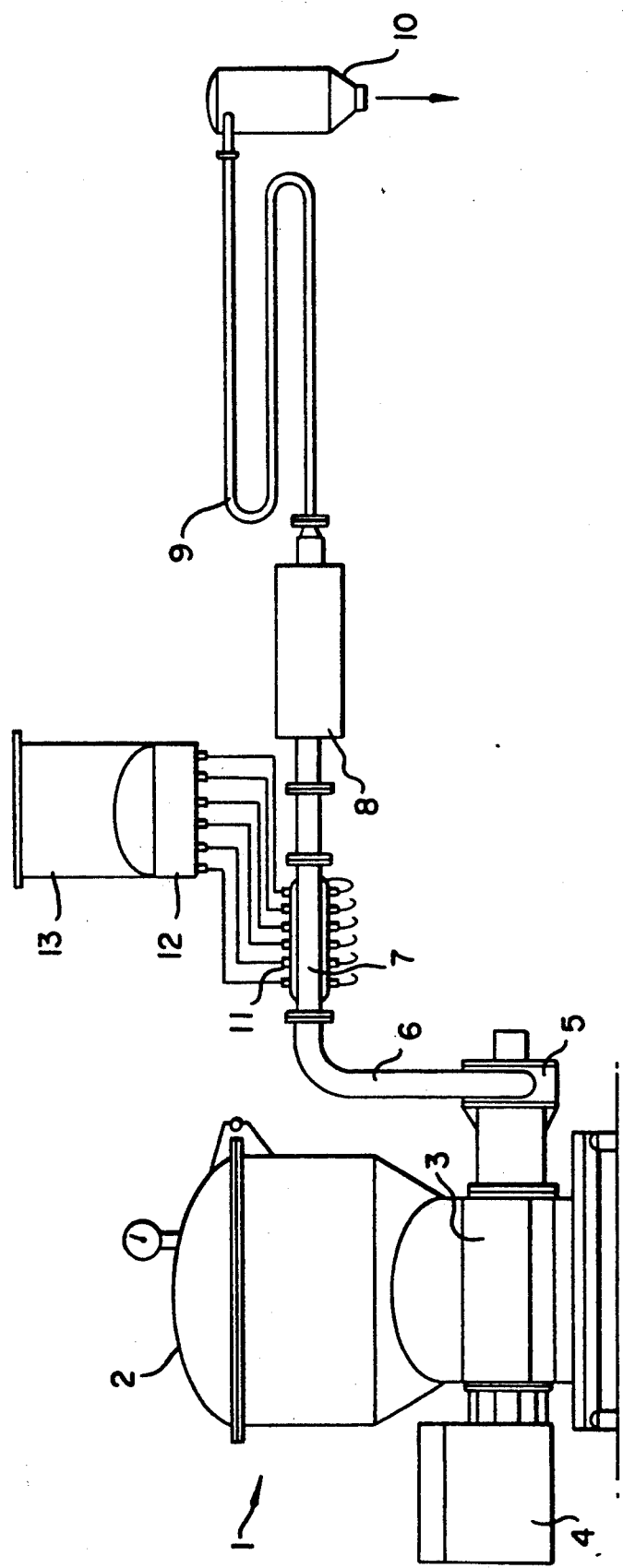

METHOD AND AN APPARATUS FOR INJECTING A LIQUID INTO MEAT

TECHNICAL FIELD

The present invention relates to a method of treating meat or similar organic material, said method comprising injecting liquid into the meat.

BACKGROUND ART

In methods of this kind, it is known to inject brine or other liquid into meat by using injection needles, which have to be inserted into the meat before injecting the liquid, and then removed again. The use of needles for this purpose is associated with many disadvantages, of which but a few may be mentioned, such as that the injection needles are costly; that the injection needles are easily broken if they are thin, and rupture or cut the meat fibres if they are thick; that the injection needles are difficult to clean and disinfect to the high standard required in food-processing apparatus; that the spacing of the injection points is set, usually permanently, by the spacing of the injection needles; and that no relative movement between the injection needles and the meat transverse to the longitudinal direction of the needles is possible, making it impossible to pass the meat at a constant speed through an injection unit.

DISCLOSURE OF THE INVENTION

It is the object of the present invention to provide a method of the kind initially referred to, that does not suffer from the disadvantages mentioned above, and this object is achieved with a method of the kind mentioned above, which according to the present invention is characterized in that the liquid is injected in the form of thin jets capable of penetrating the meat to the requisite depth. With this arrangement, the injection is achieved without the use of injection needles, so that the above-mentioned disadvantages resulting from the use of such needles are totally eliminated.

The present invention also relates to an apparatus for carrying out the method of the invention. This apparatus is of the kind comprising means for holding meat in a manner allowing it to receive liquid injected into it by injections means and is according to the present invention characterized in that said injection means is/are constituted by at least one injection nozzle with associated liquid supply means capable of supplying liquid at a pressure sufficient to cause the ensuing jet(s) of liquid issuing from the nozzle(s) to penetrate into the meat to a depth requisite for the treatment being carried out.

BRIEF DESCRIPTION OF THE DRAWING

In the following detailed specification, the present invention will be explained in more detail with reference to the drawing, the single FIGURE of which in a highly simplified manner shows an exemplary embodiment of an apparatus for carrying out the method of the invention.

DESCRIPTION OF THE PREFERRED EMBODIMENT

The exemplary embodiment of an apparatus according to the present invention shown on the drawing is adapted to receive, process and deliver meat in a number of stages arranged in sequence, i.e. a vacuum hopper 1 with a cover 2, that may be opened to allow meat (not shown) to be placed inside the vacuum hopper 1; a screw conveyor 3 driven by a motor 4 and adapted to convey meat from the vacuum hopper 1 to a rotary displacement pump 5 e.g. of the kind disclosed in European Patent No. 0.187.357, delivering meat through a pipe 6 to a brine injection unit 7, from which the meat, due to the pressure exerted by the pump 5, moves further into a vibrational massage unit 8, from which the meat continues into a deformation-massage unit 9, from which the meat continues into an outlet unit 10, which may be adapted to deliver the processed meat into a suitable container or bag or to means for conveying the meat to e.g. a packaging machine, or else for further processing.

The brine injection unit 7 contains a number of nozzles 11 adapted to direct powerful jets of brine supplied to the nozzles at high pressure by a pump unit 12, the latter being supplied with brine from a brine tank 13. The pump unit 12 may be equipped with a single pump supplying all the nozzles 11, or a number of pumps, e.g. one for each nozzle or pair of set of nozzles. These pumps may be adapted to deliver the brine continuously or—preferably—intermittently, such as in short bursts separated by comparatively longer intervals.

When the apparatus shown in the drawing is to be put into operation, the vacuum hopper 1 is opened by opening the cover 2, after which a suitable amount of meat to be processed is placed in the hopper 1, and the cover 2 closed. Then, the hopper 1 is evacuated in the normal manner so as to remove air from the hopper itself and from spaces in and between the pieces of meat. Alternatively, the hopper may have a constant vacuum and be fed through a pump or a suitable vacuum trap in order to maintain a continuous operation.

When the vacuum has reached the desired value, the motor 4 is started, and with it the screw conveyor 3 and the rotary displacement pump 5, so that the meat will literally be pumped through the pipe 6, the brine injection unit 7, the vibrational massage unit 8, the deformation-massage unit 9 and the outlet unit 10 to the receiving means connected to the latter.

During the movement through the brine injection unit 7, the meat is subjected to injection of brine by the brine jets from the nozzles 11 impinging upon it and—due to the high pressure of the liquid supplied by the pump unit 12—penetrating into the meat to a depth depending on the pressure and the physical characteristics of the meat.

As the brine injection unit 7 as well as the vibrational massage unit 8 immediately downstream of it are in the form of a substantially closed conduit—in the example shown roughly in the form of a simple shaped pipe—the brine having been injected will not flow out from the meat, and in the vibrational massage unit 8 it will be distributed among the fibres of the meat, thus achieving the desired "pickling" effect.

As the meat has been transported from the vacuum hopper 1 to the brine injection unit 7 through closed conduits, the vacuum state—at least as far as included air and gases is concerned—is still present when the meat arrives into the brine injection unit 7, so that the injection will in fact take place under vacuum conditions, provided, of course, that there is a sufficient quantity of meat in the units 8, 9 and/or 10 to prevent air from entering the injection unit 7.

If the brine jets are ejected by the nozzles 11 in a continuous manner, there is a possibility that the jets may cut longitudinal slits in the meat passing through the injection unit 7, and to avoid this slit formation, the pump unit 12 may be adapted as indicated above to deliver the brine in short bursts separated by comparatively long intervals. With this arrangement, the meat passing through the brine injection unit 7 will be subjected to a number of "shots" of brine in discrete regions, from which it will flow in between the fibres when subjected to vibration in the vibrational massage unit 8. The spacing of these discrete regions will, of course, depend on the time intervals between the "shots" and on the speed, with which the meat the meat moves through the injection unit 7, and this spacing may be adjusted to suit the particular type of meat being processed by varying either or both of these parameters. Also, the injection pressure and the duration of each "shot" may be varied to suit the particular type of meat.

In the example shown, the brine injection unit 7 and the vibrational massage unit 8 are shown as two distinct separate units, but it lies within the scope of the present invention to have these two units partly or fully integrated with each other, so that the meat may be subjected to vibrational treatment while still being injected with brine.

In the exemplary embodiment shown, there is only a single vacuum hopper 1 with associated screw conveyor 3, thus making it necessary to stop the apparatus, when a new batch of meat is to be introduced. This disadvantage may, however, be easily overcome by using two vacuum hoppers in parallel, adapted to be connected alternately to the remainder of the apparatus shown, or as previously mentioned by introducing the meat through a pump or vacuum trap.

The vibrational massage unit 8 may be equipped with vibrators of any suitable kind, such as producing infrasonic, sonic or ultrasonic vibrations of suitable frequency and amplitude, in order to achieve the requisite distribution of the injected brine between the meat fibres without causing damage to the latter. At present, ultrasonic vibrations are preferred, as they appear to be more effective in distributing the injected brine than sonic or infrasonic vibrations.

The deformation-massage unit 9, which is optional, consists of a simple tube with a substantially smaller internal diameter than the tubular parts of the brine injection units 7 and the vibrational massage unit 8. The reduction in diameter at the entrance to the deformation-massage unit 9 forces the pieces or chunks of meat to change shape, thus undergoing a kind of "deep massage", and during the passage through the massage unit 9 itself, the meat will be massaged by contact with the inside of the tube constituting this unit. An additional massage effect could be achieved by means of a spatial variation of the diameter of this tube.

In the above description, the present invention is explained with reference to treating meat with brine, i.e. a solution of common salt, possibly with certain additives. It does, however, lie within the scope of the present invention to inject other liquids into both meat, meat products and similar organic materials or products of same.

I claim:

1. A method of treating meat, comprising the steps of: conveying meat substantially continuously through a conduit which is substantially closed to the environment outside of the conduit; and
injecting a liquid in the form of thin jets into the meat as the meat is conveyed through said conduit to penetrate the meat to a given depth, said jets of liquid being applied intermittently or periodically in short bursts separated by comparatively longer intervals.

2. A method according to claim 1, wherein the meat is subjected to vibration during or after the injection of the liquid.

3. A method according to claim 1, wherein said conduit is shaped substantially like a closed pipe, thereby causing the meat to have a well-defined shape and flow.

4. A method according to claim 1, wherein the meat is vacuum-treated to remove air from the meat and is then introduced into said conduit so that an evacuated state is maintained in the meat.

5. An apparatus for treating meat comprising:
a) injection means for injecting liquid in the form of jets into meat to be treated, said injecting means including means for producing the jets of liquid intermittently in short bursts separated by comparatively longer intervals, said injection means including at least one injection nozzle and a liquid supply means, said liquid supply means being capable of supplying liquid at a pressure sufficient to cause the jets of liquid to penetrate into the meat treated to a given depth;
b) conduits which are substantially closed to the environment outside of said conduits, said at least one injection nozzle being capable of directing the jets of liquid into an interior portion of at least one of said conduits to impinge on and penetrate into meat which passes through said conduits;
d) conveying means for moving meat through said conduits from inlet means to outlet means upstream and downstream, respectively, of said at least one nozzle; and
d) means for holding meat in a manner allowing the meat to receive liquid injected into the meat by said injection means.

6. An apparatus according to claim 5, wherein said apparatus includes vibrating means for subjecting the meat to vibration during or after the injection of liquid by said injection means, said vibrating means cooperating with or comprising part of said conduits and being located at the same position as said nozzles or downstream of said nozzles.

7. An apparatus according to claim 5, wherein said apparatus includes deformation massage means comprising part of said conduits and being situated upstream of said outlet means.

8. An apparatus according to claim 5, wherein said conveying means comprises at least one displacement pump situated upstream of said injection nozzles.

9. An apparatus according to claim 5, wherein said apparatus includes a vacuum-treatment chamber situated upstream of said conveying means and connected to or comprising at least part of said inlet means.

10. An apparatus according to claim 7, wherein said conduit is substantially tubular with a substantially constant internal diameter throughout the length thereof except where said deformation massage means is located, said conduits having a substantially smaller internal diameter where said deformation massage means is located than in the other portions of said conduits.

11. A method according to claim 1, wherein the meat is subjected to vibration during and after the injection of the liquid.

12. An apparatus according to claim 5, wherein said apparatus includes vibrating means for subjecting the meat to vibrations during or after the injection of liquid by said injection means, said vibrating means cooperating with or comprising part of said conduits and being located at the same position as said nozzles and downstream of said nozzles.

13. An apparatus according to claim 8, wherein said displacement pump comprises a rotary displacement pump.

14. An apparatus according to claim 10, wherein the diameter of said conduits varies along the length of said deformation massage means.

* * * * *